(12) United States Patent
Nagata et al.

(10) Patent No.: US 10,613,037 B2
(45) Date of Patent: Apr. 7, 2020

(54) INSPECTION APPARATUS AND INSPECTION METHOD

(71) Applicant: SCREEN HOLDINGS CO., LTD., Kyoto-shi, Kyoto (JP)

(72) Inventors: Yasushi Nagata, Kyoto (JP); Yasushi Sasa, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 325 days.

(21) Appl. No.: 15/515,127

(22) PCT Filed: Apr. 28, 2015

(86) PCT No.: PCT/JP2015/062875
§ 371 (c)(1),
(2) Date: Mar. 28, 2017

(87) PCT Pub. No.: WO2016/051841
PCT Pub. Date: Apr. 7, 2016

(65) Prior Publication Data
US 2017/0219495 A1    Aug. 3, 2017

(30) Foreign Application Priority Data

Sep. 29, 2014    (JP) .................................. 2014-198207

(51) Int. Cl.
*G01N 21/88*      (2006.01)
*G01N 21/956*     (2006.01)
*G06T 7/00*       (2017.01)

(52) U.S. Cl.
CPC ......... *G01N 21/8851* (2013.01); *G01N 21/88* (2013.01); *G01N 21/956* (2013.01);
(Continued)

(58) Field of Classification Search
CPC ..... G06T 7/0006; G06T 7/001; G06T 7/0044; G06T 7/0008; G06T 2207/30108;
(Continued)

(56) References Cited

U.S. PATENT DOCUMENTS

| | | |
|---|---|---|
| 5,052,045 A | 9/1991 | Peregrim et al. |
| 5,296,942 A | 3/1994 | Yokoyama et al. |

(Continued)

FOREIGN PATENT DOCUMENTS

| | | |
|---|---|---|
| CN | 101464418 A | 6/2009 |
| CN | 102495069 A | 6/2012 |

(Continued)

OTHER PUBLICATIONS

Notification Concerning Transmittal of International Preliminary Report on Patentability received in corresponding International Patent Application No. PCT/JP2015/062875, dated Jul. 21, 2015.

(Continued)

*Primary Examiner* — Luke D Ratcliffe
(74) *Attorney, Agent, or Firm* — McDermott Will & Emery LLP

(57) ABSTRACT

In a first defect candidate area detected on the basis of a difference between a value of each pixel in a picked-up image and a value of a corresponding pixel in a reference image and a second defect candidate area detected on the basis of a ratio between a value of each pixel in the picked-up image and a value of a corresponding pixel in the reference image, an overlapping area is detected as a defect area. It is thereby possible to suppress detection of a false defect and detect a defect with high accuracy. In a preferable defect detection part, a shaking comparison part detects a defect candidate area on the basis of a difference in the pixel value between the picked-up image and the reference image, and a false information reducing part limits pixels to be used (Continued)

for obtaining the above ratio to those included in the defect candidate area.

11 Claims, 12 Drawing Sheets

(52) U.S. Cl.
CPC . *G01N 21/95607* (2013.01); *G01N 21/95684* (2013.01); *G06T 7/001* (2013.01); *G01N 2021/8864* (2013.01); *G01N 2021/8887* (2013.01); *G06T 7/0002* (2013.01)

(58) Field of Classification Search
CPC ....... G06T 2207/30148; G06T 2200/24; G06T 2207/30168; G06K 9/6215
See application file for complete search history.

(56) References Cited

U.S. PATENT DOCUMENTS

| | | | |
|---|---|---|---|
| 5,699,447 | A | 12/1997 | Alumot et al. |
| 6,539,106 | B1 | 3/2003 | Gallarda et al. |
| 6,683,974 | B1 | 1/2004 | Nagasawa et al. |
| 2003/0039387 | A1 | 2/2003 | Park et al. |
| 2004/0264759 | A1* | 12/2004 | Hattori ............... G06T 7/001 382/145 |
| 2006/0039690 | A1 | 2/2006 | Steinberg et al. |
| 2009/0153840 | A1* | 6/2009 | Yoshida ........... G01N 21/95684 356/51 |
| 2010/0027873 | A1 | 2/2010 | Kakuda |
| 2010/0149327 | A1 | 6/2010 | Okamura |
| 2010/0188499 | A1 | 7/2010 | Amanullah et al. |
| 2011/0280470 | A1 | 11/2011 | Hayashi |
| 2012/0314057 | A1 | 12/2012 | Mokichev |
| 2013/0170731 | A1 | 7/2013 | Hirota |
| 2015/0279024 | A1* | 10/2015 | Tsuchiya ............... G03F 1/84 382/144 |

FOREIGN PATENT DOCUMENTS

| | | |
|---|---|---|
| CN | 103185728 A | 7/2013 |
| JP | 4-254746 A | 9/1992 |
| JP | H10-160684 A | 6/1998 |
| JP | 11-108637 A | 4/1999 |
| JP | 2005-017234 A | 1/2005 |
| JP | 2006-125936 A | 5/2006 |
| JP | 2007-155610 A | 6/2007 |
| JP | 2008-032487 A | 2/2008 |
| JP | 2008-170325 A | 7/2008 |
| JP | 2009-097928 A | 5/2009 |
| JP | 2009-121902 A | 6/2009 |
| JP | 2009-162573 A | 7/2009 |
| JP | 2010-164487 A | 7/2010 |
| JP | 2011-237302 A | 11/2011 |
| JP | 2013-134666 A | 7/2013 |
| WO | 2008/026562 A1 | 3/2008 |

OTHER PUBLICATIONS

Korean Office Action issued in corresponding Korean Patent Application No. 10-2017-7006859, dated Jul. 11, 2018, with English Translation.
Japanese Office Action issued in corresponding Japanese Patent Application No. 2014-198207, dated Jul. 2, 2018, with English Translation.
Extended European Search Report issued in corresponding EP Patent Application No. 15847927.9, dated Apr. 10, 2018.
Search Report issued in corresponding International Patent Application No. PCT/JP2015/062875, dated Jul. 21, 2015.

\* cited by examiner

71

71

INSPECTION APPARATUS AND INSPECTION METHOD

CROSS REFERENCE

This application is the U.S. National Phase under 35 U.S.C. § 371 of International Application No. PCT/JP2015/062875, filed on Apr. 28, 2015, which claims the benefit of Japanese Application No. 2014-198207, filed on Sep. 29, 2014, the entire contents of each are hereby incorporated by reference.

TECHNICAL FIELD

The present invention relates to a technique for detecting a defect on a surface of an object.

BACKGROUND ART

Conventionally, apparatuses which pick up an image of a three-dimensional object by irradiating the object with light and inspect an appearance of the object on the basis of the picked-up image have been used. In an appearance inspection apparatus disclosed in Japanese Patent Application Laid-Open No. 2005-17234, for example, in order to inspect an appearance of a dome-shaped solder on an electronic circuit board, a first image is acquired in a state where the dome-shaped solder is irradiated with parallel rays of light from both left and right sides thereof and a second image is acquired in a state where the dome-shaped solder is irradiated with parallel rays of light from front and back sides thereof. Then, a composite image which is represented by absolute values of differences between first image data and second image data is obtained, and when strip-like shades are present radially on the composite image, a mounting failure of a chip component on the dome-shaped solder is detected.

Further, in a shape recognition apparatus disclosed in Japanese Patent Application Laid-Open No. 2009-162573, a camera for picking up images of an object to be inspected and a lighting part rotating about the camera are provided, and images of the object to be inspected are sequentially picked up with lighting angles of the lighting part being changed. In the shape recognition apparatus, since a shadow of a projection (defective shape) on the object to be inspected is changed as the lighting angle is changed, the shape of the projection can be estimated.

On the other hand, in a metal component (e.g., automobile component) formed by forging and/or casting, a surface treatment such as shot blasting and/or the like is performed thereon and a surface of the component thereby has a satin-finished three-dimensional structure with microscopic projections and depressions thereon. In an appearance inspection on such metal components, defects such as dents, flaws, and the like on surfaces of the objects are detected by visual inspection of operators.

In such an inspection of the objects by the visual check of the operators as above, even if an inspection standard is determined, there are disadvantageously variations in the accuracy of the inspection among the operators. Further, there is a possibility that defects of the objects may be overlooked by human error. In the case where defects are detected on the basis of the picked-up images of the objects, since the light entering the satin-finished surfaces is reflected diffusely, variations in the tone value of the picked-up image (local changes in the density) increase and therefore a number of false defects are disadvantageously detected.

SUMMARY OF INVENTION

The present invention is intended for an inspection apparatus for detecting a defect on a surface of an object, and it is an object of the present invention to suppress detection of a false defect and detect a defect with high accuracy.

The inspection apparatus according to the present invention includes: an image pickup part for picking up an image of an object to thereby acquire a picked-up image; a storage part for storing therein a reference image corresponding to the picked-up image; and a defect detection part for detecting an overlapping area in a first defect candidate area detected on the basis of a difference between a value of each pixel in the picked-up image and a value of a corresponding pixel in the reference image and a second defect candidate area detected on the basis of a ratio between a value of each pixel in the picked-up image and a value of a corresponding pixel in the reference image, as a defect area, or for detecting a defect area on the basis of a ratio between a value of each pixel in a differential image of the picked-up image and the reference image, and a value of a corresponding pixel in the reference image.

By the present invention, it is possible to suppress detection of a false defect and detect a defect with high accuracy.

In one preferred embodiment of the present invention, the defect detection part limits pixels to be used for obtaining the ratio between the picked-up image and the reference image to pixels included in the first defect candidate area, or limits pixels to be used for obtaining the difference between the picked-up image and the reference image to pixels included in the second defect candidate area. It is thereby possible to detect a defect with high efficiency.

In another preferred embodiment of the present invention, the second defect candidate area includes a defect candidate area in which a value of a pixel in the picked-up image is lower than a value of a corresponding pixel in the reference image and a defect candidate area in which a value of a pixel in the picked-up image is higher than a value of a corresponding pixel in the reference image, being distinguished from each other.

In still another preferred embodiment of the present invention, the defect detection part detects a third defect candidate area on the basis of a difference between a value of each pixel in the picked-up image and a value of a corresponding pixel in an image obtained by performing an expansion process or a contraction process on the picked-up image, and detects an overlapping area in the first defect candidate area, the second defect candidate area, and the third defect candidate area, as the defect area.

According to one aspect of the present invention, the object has a satin-finished area on its surface. In this case, the more preferable inspection apparatus further includes: a first lighting part for irradiating a predetermined object area on a surface of the object with light from only one direction; a second lighting part for irradiating the object area with light from a plurality of directions; a detection control part for causing the defect detection part to detect a first defect area by using a first picked-up image acquired in the image pickup part by light irradiation from the first lighting part and a first reference image corresponding to the first picked-up image and causing the defect detection part to detect a second defect area by using a second picked-up image acquired in the image pickup part by light irradiation from the second lighting part and a second reference image corresponding to the second picked-up image; and a defect updating part for specifying an overlapping area in the first defect area and the second defect area, as an updated defect area.

The present invention is also intended for an inspection method of detecting a defect on a surface of an object. The inspection method according to the present invention includes: a) picking up an image of an object in an image pickup part to thereby acquire a picked-up image; and b) detecting an overlapping area in a first defect candidate area detected on the basis of a difference between a value of each pixel in the picked-up image and a value of a corresponding pixel in a reference image and a second defect candidate area detected on the basis of a ratio between a value of each pixel in the picked-up image and a value of a corresponding pixel in the reference image, as a defect area, or detecting a defect area on the basis of a ratio between a value of each pixel in a differential image of the picked-up image and the reference image, and a value of a corresponding pixel in the reference image, the reference image corresponding to the picked-up image and being prepared in advance.

These and other objects, features, aspects and advantages of the present invention will become more apparent from the following detailed description of the present invention when taken in conjunction with the accompanying drawings.

DESCRIPTION OF EMBODIMENTS

Figure 1:
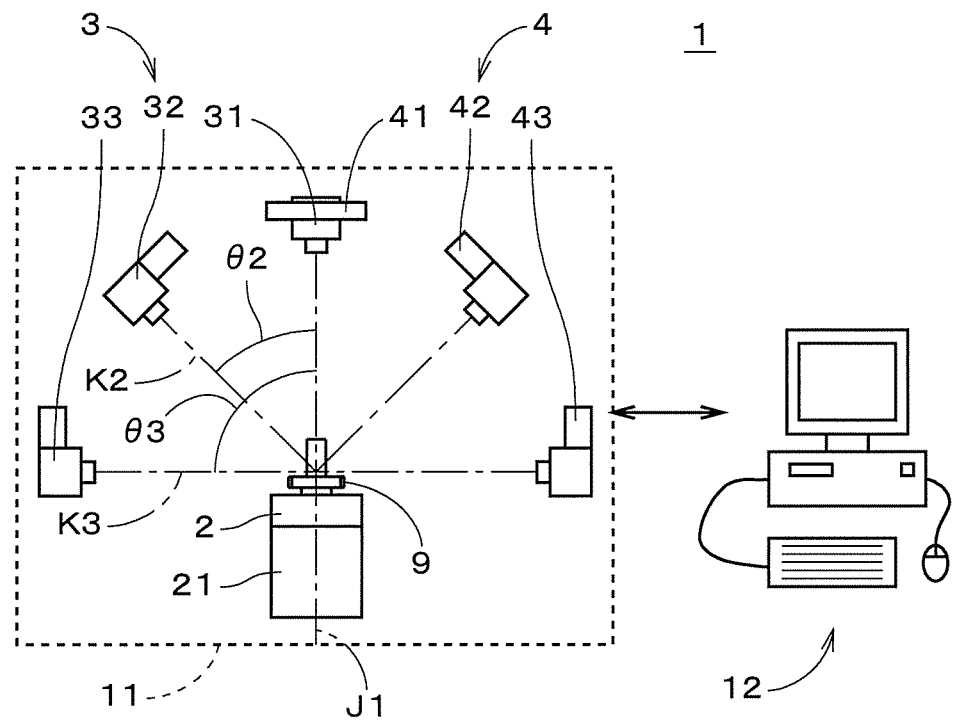
FIG. 1 is a view showing a configuration of an inspection apparatus.
Figure 2:
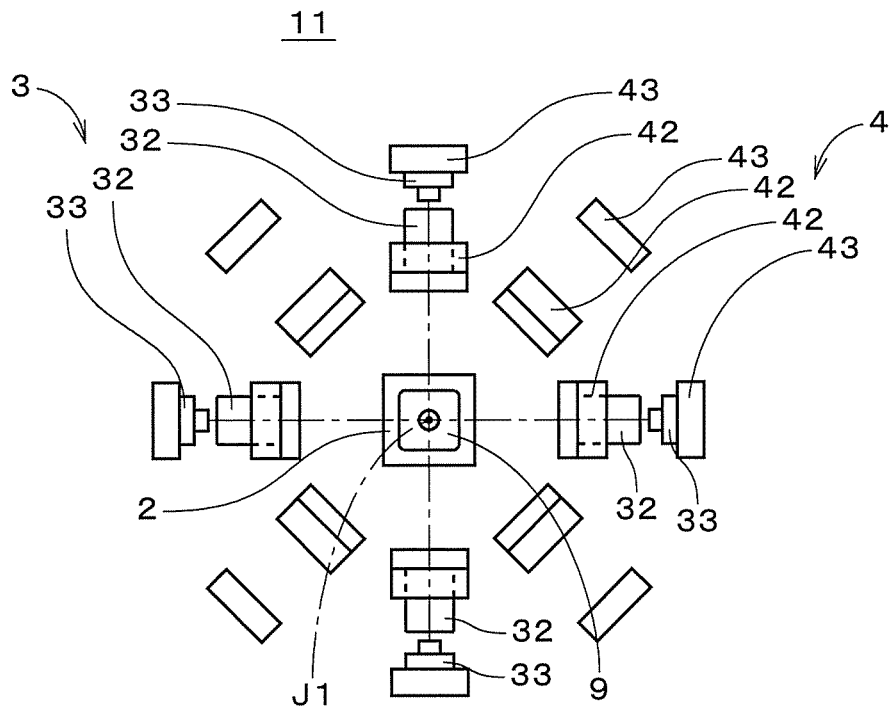
FIG. 2 is a plan view showing a main body of the inspection apparatus.

FIG. 1 is a view showing a configuration of an inspection apparatus 1 in accordance with one preferred embodiment of the present invention. FIG. 2 is a plan view showing a main body 11 of the inspection apparatus 1. The inspection apparatus 1 is an apparatus for inspecting an appearance of a three-dimensional object 9 having a gloss on its surface. The object 9 is, for example, a metal component formed by forging and/or casting, and has a satin-finished surface with microscopic projections and depressions thereon. The object 9 is, for example, one of various components (a shaft, an outer ring, a yoke, and the like of a cylindrical hub) used for universal joint.

As shown in FIG. 1, the inspection apparatus 1 includes a main body 11 and a computer 12. The main body 11 includes a stage 2, a stage rotation part 21, an image pickup unit 3, and a light source unit 4. The object 9 is placed on the stage 2. The stage rotation part 21 rotates the object 9 together with the stage 2 about a central axis J1 oriented in a vertical direction at a predetermined angle. The central axis J1 goes through the center of the stage 2. The main body 11 is provided with a light shielding cover (not shown) which prevents external light from arriving on the stage 2, and the stage 2, the image pickup unit 3, and the light source unit 4 are provided within the light shielding cover.

As shown in FIGS. 1 and 2, the image pickup unit 3 includes one upper image pickup part 31, four oblique image pickup parts 32, and four side image pickup parts 33. In FIG. 2, the upper image pickup part 31 is not shown (an upper light source part 41 described later is also not shown). The upper image pickup part 31 is disposed above the stage 2 on the central axis J1. By using the upper image pickup part 31, it is possible to acquire an image of the object 9 on the stage 2, which is picked up from directly above.

As shown in FIG. 2, when the main body 11 is viewed from above with a downward line of sight (in other words, when the main body 11 is planarly viewed), the four oblique image pickup parts 32 are arranged around the stage 2. The four oblique image pickup parts 32 are arranged circumferentially about the central axis J1 at an angular interval (pitch) of 90 degrees. In a plane including an imaging optical axis K2 of each oblique image pickup part 32 and the central axis J1 (see FIG. 1), an angle θ2 between the imaging optical axis K2 and the central axis J1 is about 45 degrees. By using each of the oblique image pickup parts 32, it is possible to acquire an image of the object 9 on the stage 2, which is picked up from diagonally upward.

When the main body 11 is planarly viewed, the four side image pickup parts 33 are also arranged around the stage 2 as with the four oblique image pickup parts 32. The four side image pickup parts 33 are arranged circumferentially at an angular interval of 90 degrees. In a plane including an imaging optical axis K3 of each side image pickup part 33 and the central axis J1, an angle θ3 between the imaging optical axis K3 and the central axis J1 is about 90 degrees. By using each of the side image pickup parts 33, it is possible to acquire an image of the object 9 on the stage 2, which is picked up from a side. The upper image pickup part 31, the oblique image pickup part 32, and the side image pickup part 33 each have, for example, a CCD (Charge Coupled Device), a CMOS (Complementary Metal-Oxide Semiconductor), or the like, and can acquire multi-gradation images. The upper image pickup part 31, the oblique image pickup parts 32, and the side image pickup parts 33 are supported by a supporting part (not shown).

The light source unit 4 includes one upper light source part 41, eight oblique light source parts 42, and eight side light source parts 43. The upper light source part 41 is a light source part in which a plurality of LEDs (light emitting diodes) are arranged like a ring around the central axis J1. The ring-like upper light source part 41 is so fixed to the upper image pickup part 31 as to surround the circumference of the upper image pickup part 31. By using the upper light source part 41, it is possible to irradiate the object 9 on the stage 2 with light along a direction parallel with the central axis J1 from directly above.

When the main body 1 is planarly viewed, the eight oblique light source parts 42 are arranged around the stage 2. The eight oblique light source parts 42 are arranged circumferentially at an angular interval of 45 degrees. Each of the oblique light source parts 42 is a light source part in which a plurality of LEDs are arranged like a bar extending in a direction of tangent of a circumference about the central axis J1. Assuming that a line connecting a center of a light outgoing surface of each oblique light source part 42 and (a center of) the object 9 is termed "lighting axis", in a plane including the lighting axis of the oblique light source part 42 and the central axis J1, an angle between the lighting axis and the central axis J1 is about 45 degrees. By using each oblique light source part 42, it is possible to irradiate the object 9 on the stage 2 with light along the lighting axis from diagonally upward. In the inspection apparatus 1, out of the eight oblique light source parts 42, four oblique light source parts 42 are fixed to the four oblique image pickup parts 32, respectively, and the remaining four oblique light source parts 42 are supported by the not-shown supporting part.

When the main body 1 is planarly viewed, the eight side light source parts 43 are arranged around the stage 2. The eight side light source parts 43 are arranged circumferentially at an angular interval of 45 degrees. Each of the side light source parts 43 is a light source part in which a plurality of LEDs are arranged like a bar extending in a direction of tangent of a circumference about the central axis J1. Assuming that a line connecting a center of a light outgoing surface of each side light source part 43 and the object 9 is termed "lighting axis" like in the case of the oblique light source part 42, in a plane including the lighting axis of the side light source part 43 and the central axis J1, an angle between the lighting axis and the central axis J1 is about 90 degrees. By using each side light source part 43, it is possible to irradiate the object 9 on the stage 2 with light along the lighting axis from a side. In the inspection apparatus 1, out of the eight side light source parts 43, four side light source parts 43 are fixed to the four side image pickup parts 33, respectively, and the remaining four side light source parts 43 are supported by the not-shown supporting part.

For example, a distance between the object 9, and the upper image pickup part 31 and the upper light source part 41 is about 55 cm (centimeters). Further, a distance between the object 9, and the oblique image pickup part 32 and the oblique light source part 42 is about 50 cm, and a distance between the object 9, and the side image pickup part 33 and the side light source part 43 is about 40 cm. In the upper light source part 41, the oblique light source parts 42, and the side light source parts 43, some types of light sources other than the LED may be used.

Figure 3:
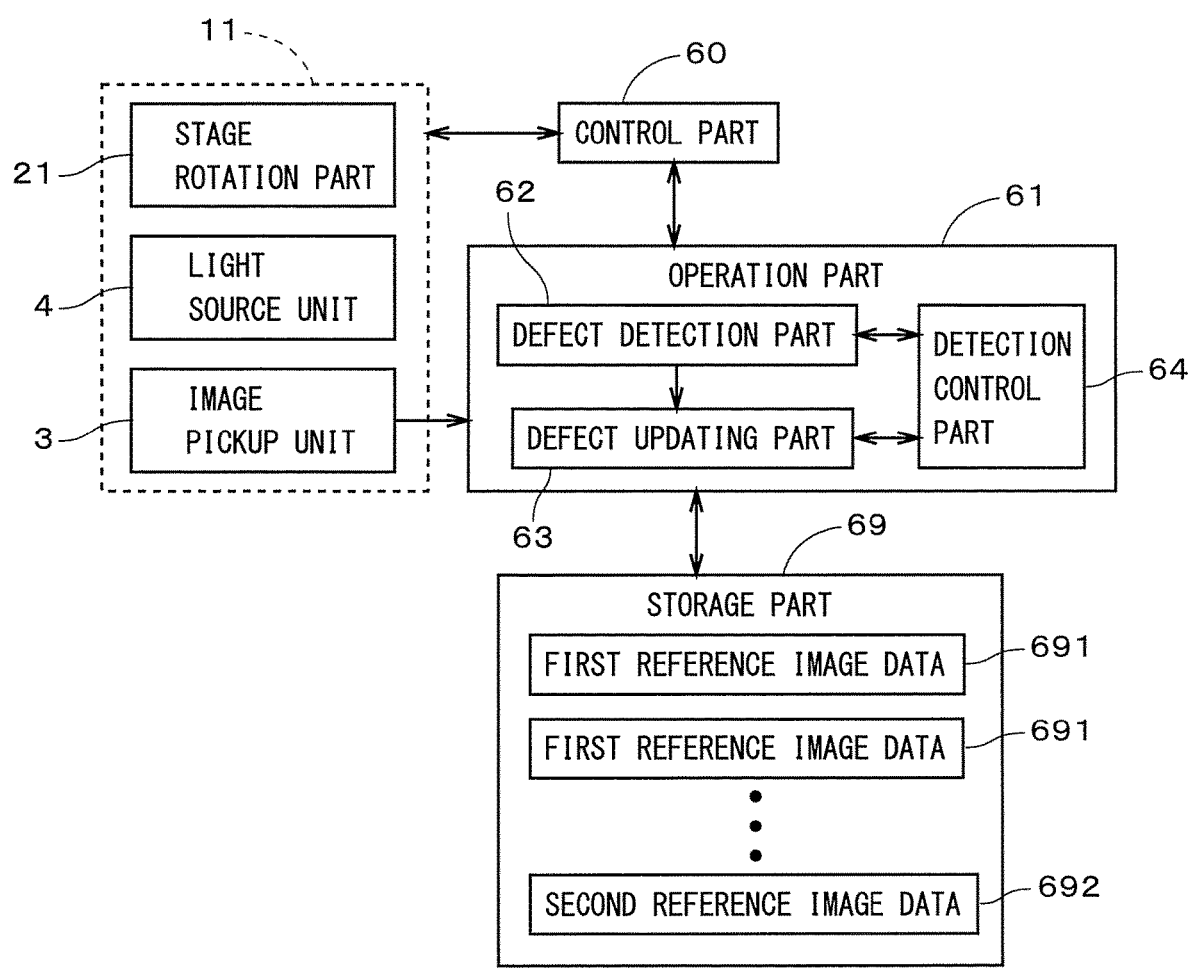
FIG. 3 is a block diagram showing a functional constitution implemented by a computer.

FIG. 3 is a block diagram showing a functional constitution implemented by the computer 12. FIG. 3 also shows the constitution of the main body 11 (the stage rotation part 21, the image pickup unit 3, and the light source unit 4) by using blocks. The computer 12 includes a control part 60, an operation part 61, and a storage part 69. The control part 60 performs general control of the inspection apparatus 1. The operation part 61 includes a defect detection part 62, a defect updating part 63, and a detection control part 64. The defect detection part 62 detects a defect area on the basis of picked-up images acquired by the image pickup unit 3. The detection control part 64 causes the defect detection part 62 to detect a defect area for each of a plurality of picked-up images obtained by picking up images of the same area. The defect updating part 63 further specifies a final defect area from the defect areas of the plurality of picked-up images. The storage part 69 stores therein various image data. Detailed description of the defect detection part 62, the detection control part 64, and the defect updating part 63 will be made later.

Figure 4:
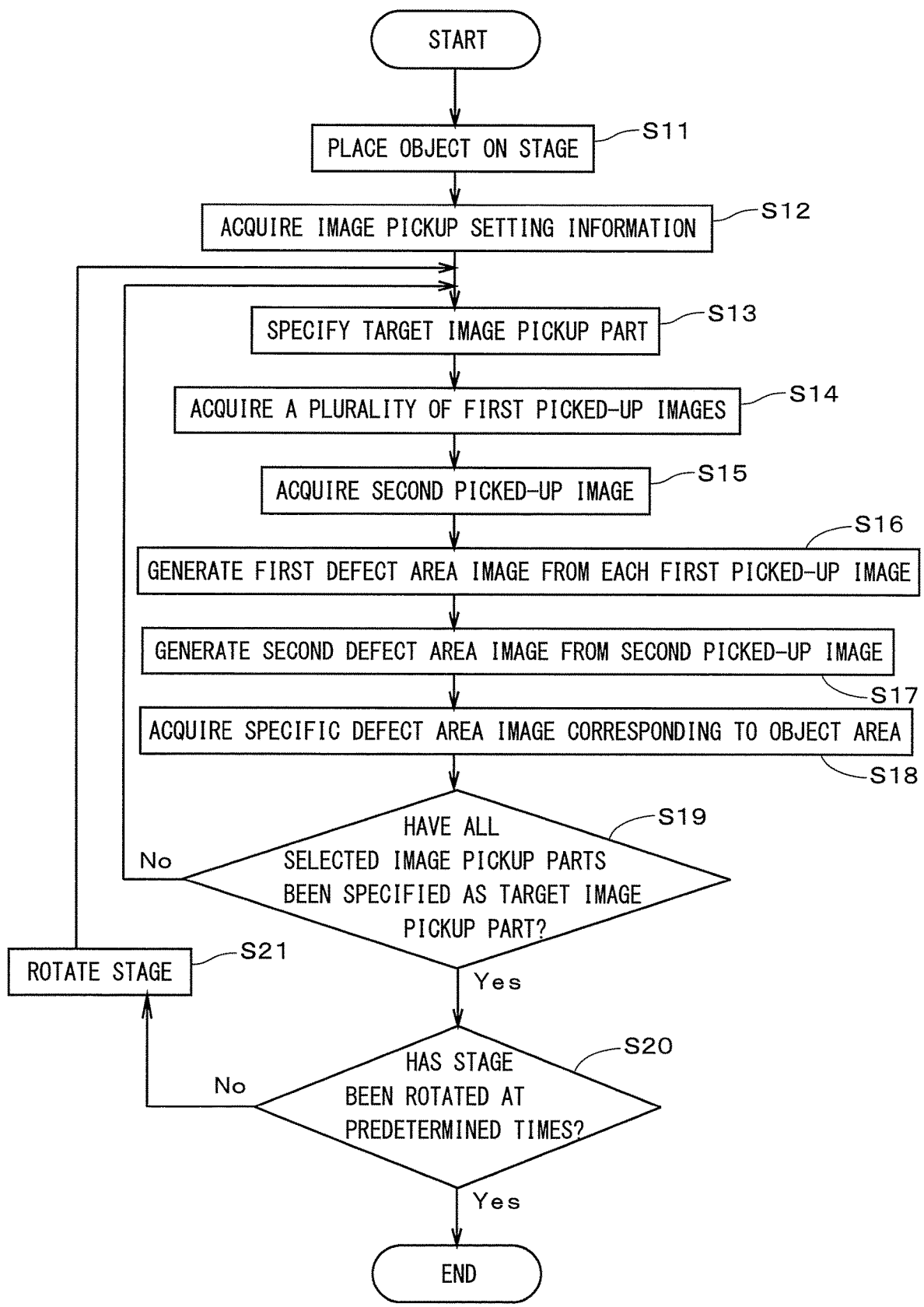
FIG. 4 is a flowchart showing an operation flow of an inspection on an object.

FIG. 4 is a flowchart showing an operation flow of an inspection performed on the object 9 by the inspection apparatus 1. First, the object 9 to be inspected is placed on the stage 2 (Step S11). On the stage 2, provided are, for example, a plurality of pins for alignment, and by bringing predetermined portions of the object 9 into contact with the plurality of pins, the object 9 is disposed on a predetermined position of the stage 2 in a predetermined orientation. Subsequently, the control part 60 acquires image pickup setting information for the object 9 on the stage 2 on the basis of an input or the like by an operator (Step S12). Herein, the image pickup setting information indicates an image pickup part (hereinafter, also referred to as a "selected image pickup part") to be used in the image pickup unit 3 and a light source part to be lighted in the light source unit 4 when the selected image pickup part acquires a picked-up image.

In the present exemplary process, the image pickup setting information indicates that the four oblique image pickup parts 32 in the image pickup unit 3 are to be used as the selected image pickup parts. Further, the image pickup setting information instructs each of the oblique image pickup parts 32 which are the selected image pickup parts to acquire images with each of the oblique light source part 42 which is placed at the same position as that of the oblique image pickup part 32, two oblique light source parts 42 adjacent clockwise to the above oblique light source part 42, and other two oblique light source parts 42 adjacent counterclockwise to the above oblique light source part 42 (hereinafter, these oblique light source parts 42 are referred to as a "specific light source part group") being lighted and to acquire images with all the light source parts included in the specific light source part group being lighted. When the main body 11 is viewed from above with a downward line of sight, the lighting axes of the five oblique light source parts 42 included in the specific light source part group corresponding to each oblique image pickup part 32 are inclined with respect to the imaging optical axis K2 of the oblique image pickup part 32 by −90 degrees, −45 degrees, 0 degrees, +45 degrees, and +90 degrees, respectively. In other words, the five oblique light source parts 42 are placed circumferentially about the central axis J1 at the angular positions of −90 degrees, −45 degrees, 0 degrees, +45 degrees, and +90 degrees with respect to the oblique image pickup part 32, respectively.

After the image pickup setting information for the object 9 is acquired, one of the plurality of oblique image pickup parts 32 which are the selected image pickup parts is specified as a target image pickup part (Step S13). Subsequently, a picked-up image is acquired by the target image pickup part 32 while only one oblique light source part 42 among the specific light source part group for the target image pickup part 32 is lighted. At that time, with an area on the surface of the object 9, which almost faces the target image pickup part 32, defined as an "object area", the oblique light source part 42 irradiates the object area with light along the lighting axis thereof. Thus, the target image pickup part 32 picks up an image of the object area while one of the oblique light source parts 42 included in the specific light source part group irradiates the object area with light from only one direction. In the following description, the picked-up image acquired in the target image pickup part by the light irradiation from only one light source part is referred to as a "first picked-up image", and the light source part which irradiates the object area with light in order to acquire the first picked-up image is referred to as a "first lighting part". In the first picked-up image acquired by the light irradiation from only one direction, it is likely to cause shadows to appear due to the microscopic projections and depressions on the object area.

In the inspection apparatus 1, by the control of the control part 60, by sequentially using each of the plurality of oblique light source parts 42 included in the specific light source part group as the first lighting part, a plurality of first picked-up images are acquired in the target image pickup part 32 (Step S14). As described earlier, the specific light source part group includes the oblique light source parts 42 arranged at the angular positions of −90 degrees, −45 degrees, 0 degrees, +45 degrees, and +90 degrees with respect to the target image pickup part 32, respectively. Assuming that the first picked-up image acquired by using the light source part placed at the angular position of N degrees with respect to the target image pickup part as the first lighting part is referred to as a "first picked-up image by lighting at N degrees", in Step S14, the first picked-up image by lighting at −90 degrees, the first picked-up image by lighting at −45 degrees, the first picked-up image by lighting at 0 degrees, the first picked-up image by lighting at +45 degrees, and the first picked-up image by lighting at +90 degrees are acquired. The plurality of oblique light source parts 42 included in the specific light source part group can be regarded as a plurality of first lighting parts used for acquiring the plurality of first picked-up images. Further, each of the oblique light source parts 42 included in the specific light source part group does not necessarily irradiate the entire object area with light, but the oblique light source part 42 placed at the angular position of −90 degrees irradiates about half of the object area with light. The light source part used as the first lighting part only has to irradiate each part of the object area, which can be irradiated with light, with light from only one direction.

Subsequently, a picked-up image is acquired by the target image pickup part 32 while all the oblique light source parts 42 included in the specific light source part group for the target image pickup part 32 are lighted (Step S15). At that time, the plurality of oblique light source parts 42 placed at the angular positions of −90 degrees, −45 degrees, 0 degrees, +45 degrees, and +90 degrees with respect to the target image pickup part 32 irradiate the object area with light along the lighting axes thereof. Thus, the target image pickup part 32 picks up an image of the object area while the plurality of oblique light source parts 42 irradiate the object area with light from a plurality of different directions. In the following description, the picked-up image acquired in the target image pickup part by the light irradiation from all the light source parts included in the specific light source part group is referred to as a "second picked-up image", and a set of all the light source parts which irradiate the object 9 with light in order to acquire the second picked-up image is referred to as a "second lighting part".

As described earlier, though each of the oblique light source parts 42 included in the specific light source part group does not necessarily irradiate the entire object area with light, the second lighting part irradiates each part of the object area with light from at least two oblique light source parts 42, i.e., from at least two directions. In the present exemplary process, each part of the object area is irradiated with light from at least three oblique light source parts 42.

In the second picked-up image acquired by the light irradiation from a plurality of directions, it is unlikely to cause shadows to appear due to the microscopic projections and depressions on the object area. In the inspection apparatus 1, respective intensities of light emitted from the plurality of oblique light source parts 42 included in the specific light source part group are almost equal to one another. Further, the intensity of light emitted from each oblique light source part 42 in order to acquire the second picked-up image is lower than that of light emitted from the oblique light source part 42 in order to acquire the first picked-up image.

Figure 5:
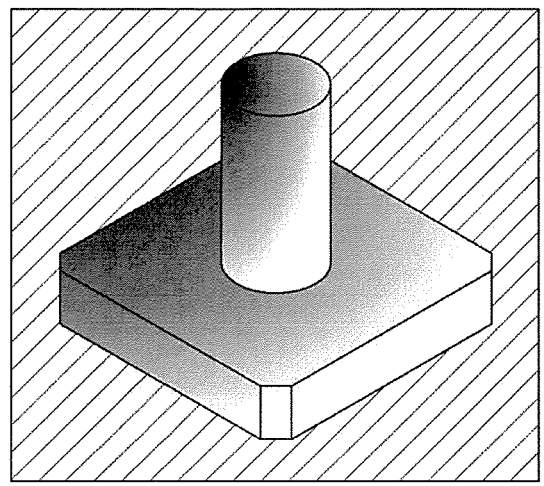
FIG. 5 is a view showing a first picked-up image.
Figure 6:
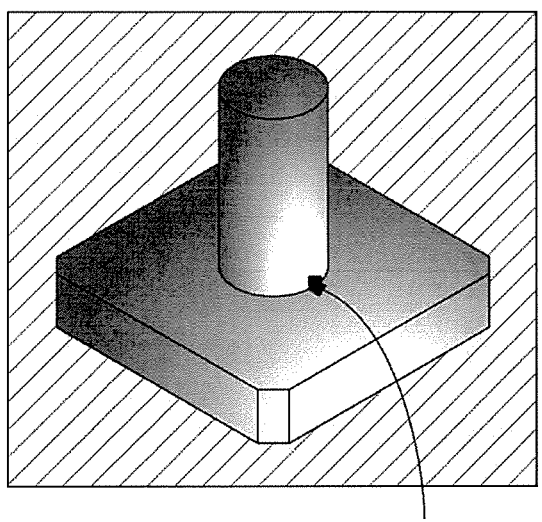
FIG. 6 is another view showing a first picked-up image.
Figure 7:
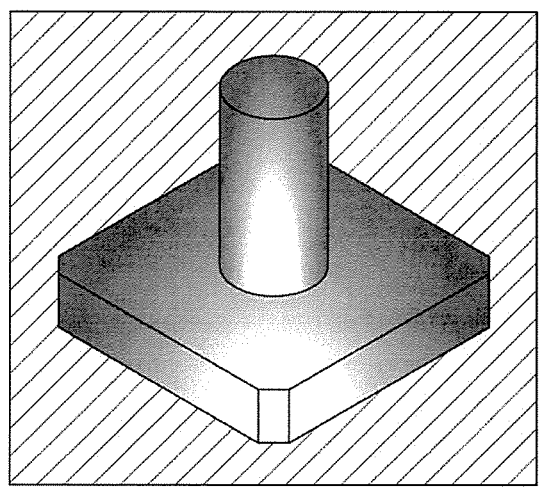
FIG. 7 is still another view showing a first picked-up image.
Figure 8:
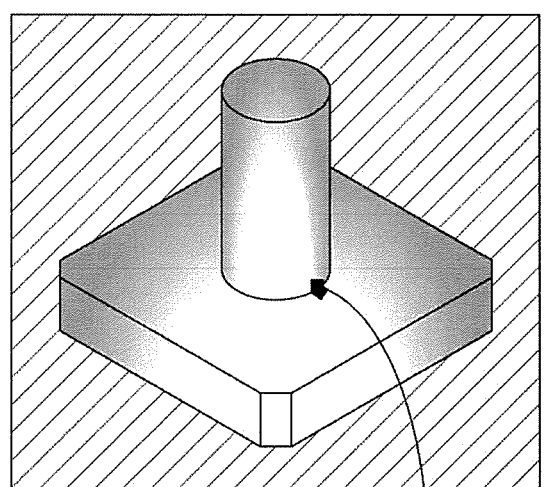
FIG. 8 is a view showing a second picked-up image.

FIGS. 5 to 7 are views each showing an exemplary first picked-up image. FIG. 5 shows the first picked-up image by lighting at −90 degrees, FIG. 6 shows the first picked-up image by lighting at −45 degrees, and FIG. 7 shows the first picked-up image by lighting at 0 degrees. FIG. 8 is a view showing an exemplary second picked-up image. As described above, the second picked-up image is acquired by the light irradiation from the second lighting part, i.e., by all lightings at −90 degrees, −45 degrees, 0 degrees, +45 degrees, and +90 degrees. In FIGS. 5 to 8, an area representing a background of the object 9 is hatched. In the first and second picked-up images, a higher value (tone value) of a pixel indicates that the pixel is brighter.

Herein, in the picked-up image, in a defect area indicating a depression or projection defect (for example, a depression or projection defect which is sufficiently larger than the microscopic projection or depression on the satin-finished surface) on the object area, normally, the difference in brightness from a surrounding area increases due to the light emitted from a direction. Further, depending on the shape of the defect (an angle of the depression, or the like), the difference in brightness between the defect area and the surrounding area, which is caused by the light emitted from another direction, is small. In the examples shown in FIGS. 5 to 8, the defect area becomes distinguishably bright against the surrounding area by lighting at −45 degrees, and the defect area is hardly distinguishable by lighting from other directions. Therefore, in the first picked-up image of FIG. 6 by lighting at −45 degrees and the second picked-up image of FIG. 8 by all lightings at −90 degrees, −45 degrees, 0 degrees, +45 degrees, and +90 degrees, the defect area (hereinafter, referred to as a "true defect area", for distinction from a false defect area described later) becomes distinguishably bright against the surrounding area. In the first picked-up image of FIG. 6 and the second picked-up image of FIG. 8, the true defect area 71 is filled in black. As a matter of course, some other true defect areas 71 can be present in the other first picked-up images and the second picked-up image.

Further, in the plurality of first picked-up images and the second picked-up image, an area having a brightness different from that of the surrounding area, which is due to the satin-finished surface of the object area, is irregularly present. As described later, in the inspection based on the picked-up images, the picked-up images are compared with other images, and in the comparison result, such an area (area having a different brightness) in the picked-up image and the other image can be detected as a false defect area. Since the second picked-up image has a lighting state different from that of the first picked-up image, a position in the second picked-up image where the false defect area occurs is not always coincident with that in the first picked-up image. The plurality of first picked-up images acquired by lighting of the respective oblique light source parts 42 included in the specific light source part group and the second picked-up image acquired by lightings of all the oblique light source parts 42 included in the specific light source part group are inputted to the defect detection part 62 of the operation part 61 shown in FIG. 3.

On the other hand, in the storage part 69, stored in advance are a first reference image corresponding to each first picked-up image and a second reference image corresponding to the second picked-up image. Herein, the first reference image corresponding to each first picked-up image is an image acquired under the same condition as that of the first picked-up image, indicating the object area which does not include any defect. The first reference image is acquired, for example, by performing the same process as that of above-described Step S14 on an object with no defect, and stored into the storage part 69 as first reference image data 691. The first reference image corresponding to each first picked-up image may be generated by performing a predetermined process on the first picked-up image. The same applies to the second reference image corresponding to the second picked-up image, and the second reference image is stored into the storage part 69 as second reference image data 692. The first reference image and the second reference image are used in the process performed by the defect detection part 62.

Figure 9:
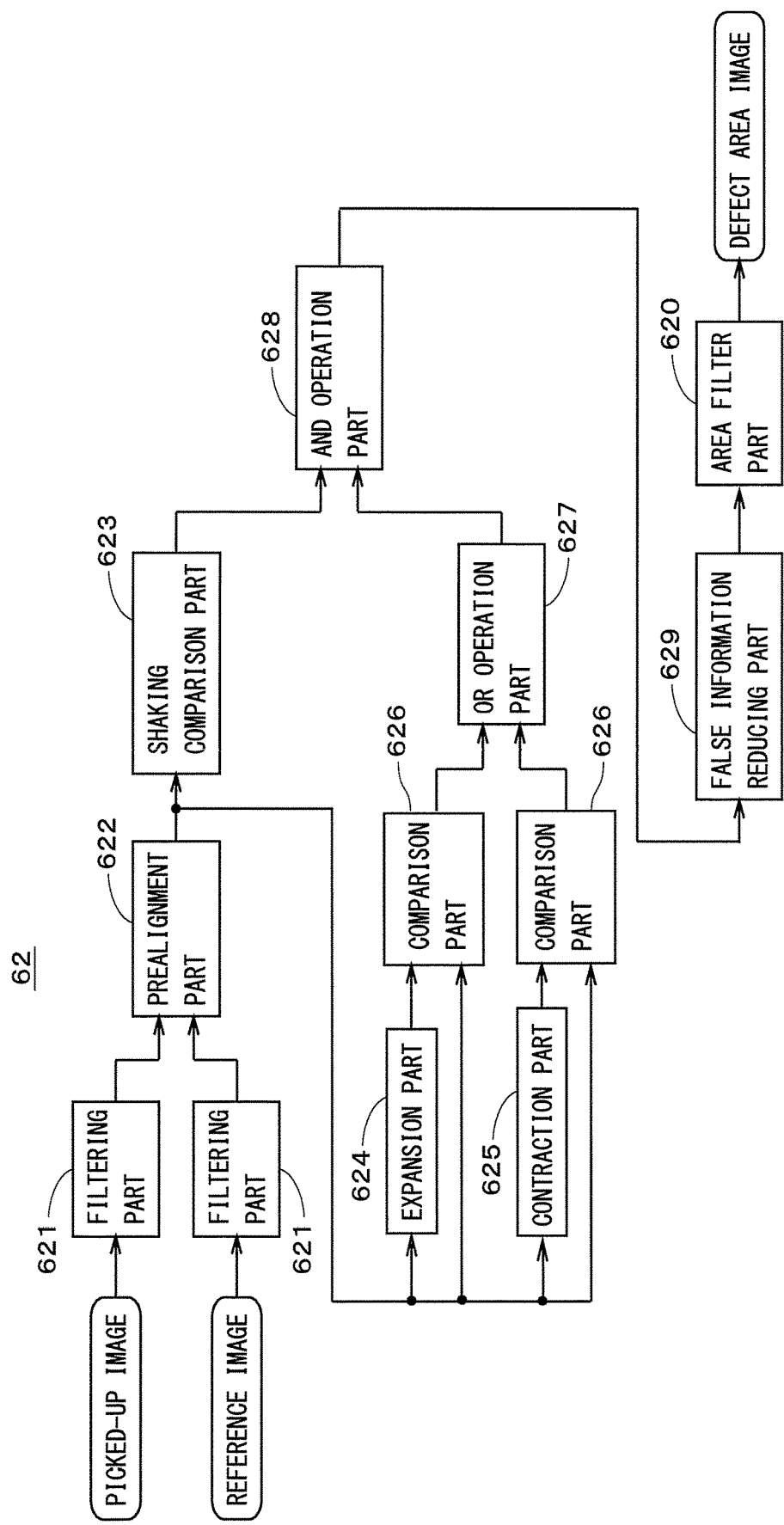
FIG. 9 is a view showing a constitution of a defect detection part.
Figure 10:
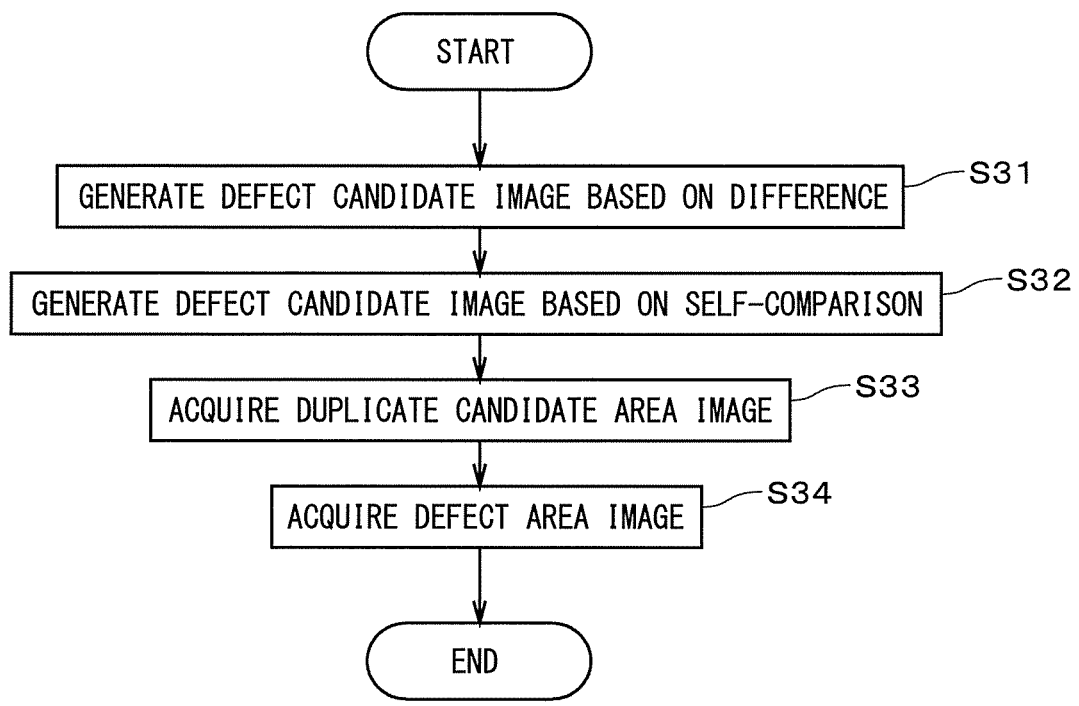
FIG. 10 is a flowchart showing an operation flow of detecting a defect.

FIG. 9 is a view showing a constitution of the defect detection part 62, and FIG. 10 is a flowchart showing an operation flow of detecting a defect in the defect detection part 62. Since the same process is performed on the plurality of first picked-up images and the second picked-up image in the defect detection part 62, in the following description, each of the plurality of first picked-up images and the second picked-up image is referred to simply as a "picked-up image" and the first reference image or the second reference image corresponding to the picked-up image is referred to simply as a "reference image".

In two filtering parts 621, filtering processes each for reducing noises, using a median filter, a Gaussian filter, or the like, are respectively performed on the picked-up image and the reference image, and the picked-up image and the reference image after being subjected to the filtering process are outputted to a prealignment part 622. In the prealignment part 622, the amounts of deviation in relative position and angle of the reference image (after being subjected to the filtering process) with respect to the picked-up image are specified by pattern matching using a predetermined pattern. Then, by parallelly moving and rotating the reference image with respect to the picked-up image by the amounts of deviation in position and angle between these images, the position and angle of the reference image can be aligned with those of the picked-up image (in other words, a prealignment is performed).

In a shaking comparison part 623, in an operation of moving the reference image from the position after the prealignment with respect to the picked-up image to each of a plurality of positions in two-dimensional arrangement, obtained is an evaluation value indicating the difference between the reference image after being moved and the picked-up image (for example, a sum of the differences (absolute values) in pixel values in an area in which these images overlap each other). Then, an image representing the differences (absolute values) in the pixel values of these images at a position where the evaluation value becomes minimum is binarized with a predetermined threshold value, and a binary defect candidate image is generated. Further, there may be a case where a predetermined process is performed on the image representing the difference and then the image is binarized (the same applies to the following). Thus, in the shaking comparison part 623, on the basis of a difference between a value of each pixel in the picked-up image and a value of a corresponding pixel in the reference image, generated is a defect candidate image (hereinafter, referred to as a "defect candidate image based on a difference") representing an area of defect candidate in the object area (Step S31). In other words, a defect candidate area based on the difference in the object area is detected.

Figure 11:
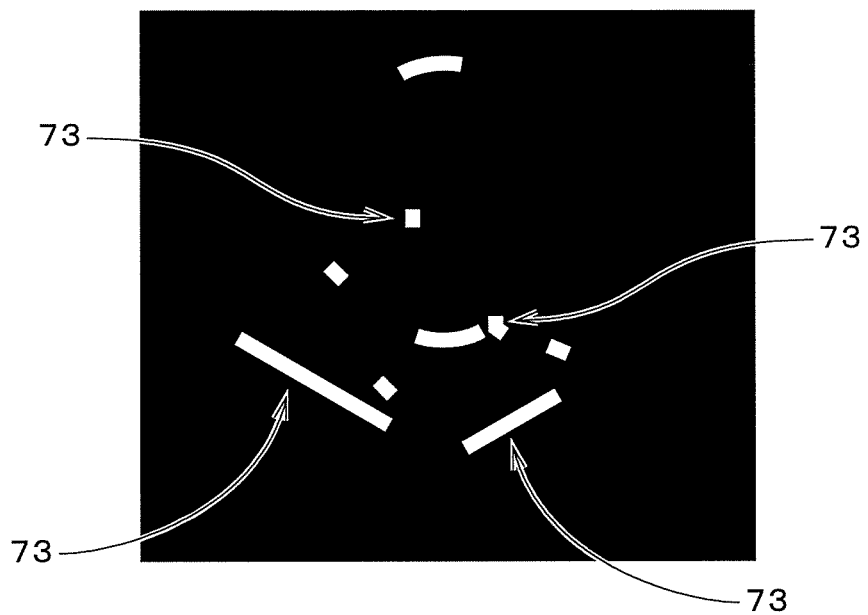
FIG. 11 is a view showing a defect candidate image based on a difference.

FIG. 11 is a view showing a defect candidate image based on the difference, which is derived from the second picked-up image of FIG. 8. The defect candidate image based on the difference shown in FIG. 11 is a binary image representing a defect candidate area 73 based on the difference, and the defect candidate area 73 based on the difference includes not only the true defect area 71 of FIG. 8 but also a plurality of false defect areas obtained due to the picked-up image or the reference image.

On the other hand, the picked-up image outputted from the prealignment part 622 is inputted to an expansion part 624 and a contraction part 625, and also inputted to two comparison parts 626. In the expansion part 624, by operating a maximum filter of predetermined size on the picked-up image, performed is an expansion process of substantially expanding an area having a relatively high pixel value in the picked-up image of multitone. By performing the expansion process, an area having a relatively low pixel value is removed or reduced. The picked-up image after being subjected to the expansion process is outputted to one of the comparison parts 626. In the comparison part 626, generated is an image representing differences (absolute values) in the pixel values between the picked-up image inputted from the prealignment part 622 and the picked-up image after being subjected to the expansion process. The image is binarized with a predetermined threshold value, to thereby generate a binary image (hereinafter, referred to as a "first intermediate image") representing an area of defect candidate.

In the contraction part 625, by operating a minimum filter of predetermined size on the picked-up image, performed is a contraction process of substantially contracting an area having a relatively high pixel value in the picked-up image of multitone. By performing the contraction process, the area having a relatively high pixel value is removed or reduced. The picked-up image after being subjected to the contraction process is outputted to the other comparison part 626. In the comparison part 626, generated is an image representing differences (absolute values) in the pixel values between the picked-up image inputted from the prealignment part 622 and the picked-up image after being subjected to the contraction process. The image is binarized with a predetermined threshold value, to thereby generate a binary image (hereinafter, referred to as a "second intermediate image") representing an area of defect candidate.

Into an OR operation part 627, a value of each pixel in the first intermediate image is inputted from one of the comparison parts 626, and a value of the pixel in the second intermediate image, which is present at the same position as that of the above pixel in the first intermediate image, is inputted from the other comparison part 626. Then, obtained is a logical sum of the value of each pixel in the first intermediate image and the value of the corresponding pixel in the second intermediate image. Therefore, in the OR operation part 627, when the first intermediate image and the second intermediate image are accurately overlaid on each other, a value indicating the defect candidate area is outputted for (a position of) a pixel included in the area of defect candidate of the first intermediate image or the second intermediate image. Further, a value indicating a non-defect area is outputted for a pixel not included in the area of defect candidate of the first intermediate image or the second intermediate image. By cooperation of the expansion part 624, the contraction part 625, the two comparison parts 626, and the OR operation part 627, generated is a defect candidate image (hereinafter, referred to as a "defect candidate image based on a self-comparison") representing an area of defect candidate in the object area, on the basis of the difference between the value of each pixel in the picked-up image and the value of the corresponding pixel in the image obtained by performing the expansion process or the contraction process on the picked-up image (Step S32). In other words, the defect candidate area based on the self-comparison in the object area is detected.

Figure 12:
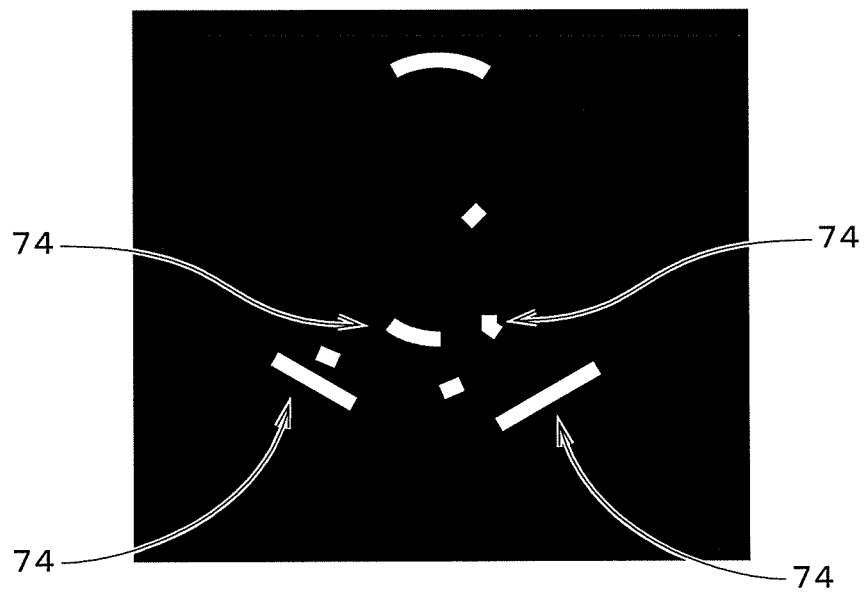
FIG. 12 is a view showing a defect candidate image based on a self-comparison.

FIG. 12 is a view showing a defect candidate image based on the self-comparison, which is derived from the second picked-up image of FIG. 8. The defect candidate image based on the self-comparison shown in FIG. 12 is a binary image representing a defect candidate area 74 based on the self-comparison, and the defect candidate area 74 based on the self-comparison includes not only the true defect area 71 of FIG. 8 but also a plurality of false defect areas obtained due to the picked-up image or the picked-up image after being subjected to the expansion process or the contraction process. There is a portion different between the defect candidate area 73 based on the difference shown in FIG. 11 and the defect candidate area 74 based on the self-comparison shown in FIG. 12.

Into an AND operation part 628, a value of each pixel in the defect candidate image based on the difference is inputted from the shaking comparison part 623, and a value of corresponding pixel in the defect candidate image based on the self-comparison is inputted from the OR operation part 627. Then, a logical product of the values of the pixels at the same position in these images is obtained and outputted to a false information reducing part 629. Therefore, in the AND operation part 628, when these images are accurately overlaid on each other, a value indicating a duplicate defect candidate area (hereinafter, referred to as a "duplicate candidate area") is outputted for a pixel in an overlapping area of the defect candidate area 73 based on the difference and the defect candidate area 74 based on the self-comparison. Further, the value indicating the non-defect area is outputted for a pixel in a not-overlapping area of the defect candidate area 73 based on the difference and the defect candidate area 74 based on the self-comparison. Thus, obtained is a duplicate candidate area image representing the overlapping area of the defect candidate area 73 based on the difference and the defect candidate area 74 based on the self-comparison, as the duplicate candidate area (Step S33).

Figure 13:
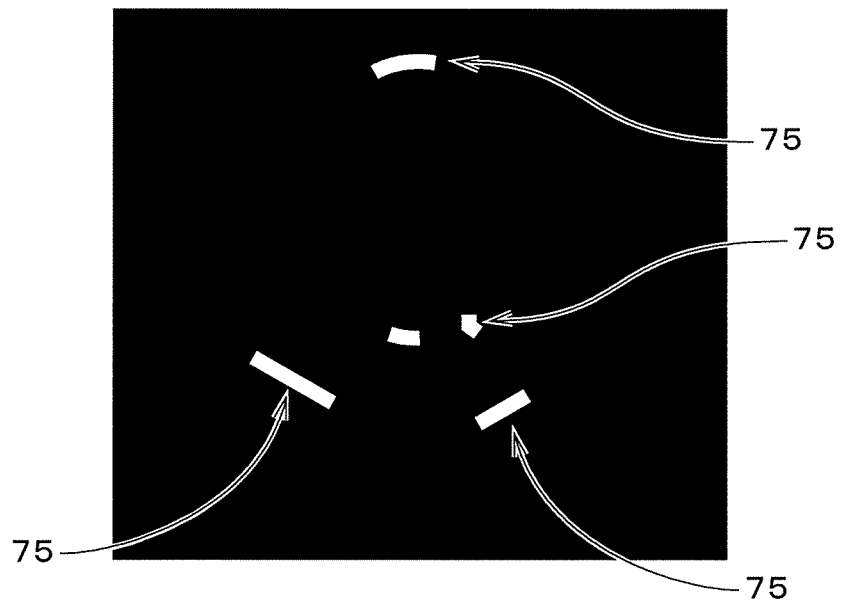
FIG. 13 is a view showing a duplicate candidate area image.

FIG. 13 is a view showing a duplicate candidate area image derived from the defect candidate image based on the difference shown in FIG. 11 and the defect candidate image based on the self-comparison shown in FIG. 12. The area of the duplicate candidate area 75 represented by the duplicate candidate area image of FIG. 13 is smaller than the area of the defect candidate area 73 based on the difference shown in FIG. 11, and than the area of the defect candidate area 74 based on the self-comparison shown in FIG. 12. Further, an area corresponding to the true defect area 71 of FIG. 8, which is present in both the defect candidate image based on the difference and the defect candidate image based on the self-comparison, is detected as the duplicate candidate area 75.

In the false information reducing part 629, by dividing the value of each pixel in the picked-up image, which is included in the duplicate candidate area 75, by the value of the corresponding pixel in the reference image, a ratio (a value of ratio) of these pixels is obtained. Then, when the value of ratio is included in a predetermined first determination range having a lower limit value and an upper limit value each of which is smaller than 1, a value indicating a dark defect area is given to (the position of) the pixel. When the value of ratio is included in a predetermined second determination range having a lower limit value and an upper limit value each of which is larger than 1, a value indicating a bright defect area is given to the pixel. A value indicating the non-defect area is given to a pixel whose value of ratio is not included in the first determination range or the second determination range, and a pixel not included in the duplicate candidate area 75. Thus, a ternary image representing the dark defect area included in the first determination range and the bright defect area included in the second determination range is acquired. For example, as to the first determination range R1, 0.1<R1<0.8, and as to the second determination range R2, 1.2<R2<2.5. The first determination range R1 and the second determination range R2 may be changed as appropriate.

The first determination range and the second determination range described above are ranges used for detecting the defect candidate area on the basis of the ratio between the value of each pixel in the picked-up image and the value of the corresponding pixel in the reference image. Therefore, the above-described process in the false information reducing part 629 can be regarded as a process of detecting an overlapping area in the defect candidate area detected on the basis of the above ratio between the picked-up image and the reference image and the duplicate candidate area 75, as the defect area.

In an area filter part 620, in the ternary image, a set of successive pixels each having the value indicating the dark defect area is specified as the dark defect area, and when the area of the dark defect area is smaller than a predetermined area threshold value, the values of the pixels included in the dark defect area are changed (corrected) to the values indicating the non-defect area. Similarly, a set of successive pixels each having the value indicating the bright defect area is specified as the bright defect area, and when the area of the bright defect area is smaller than a predetermined area threshold value, the values of the pixels included in the bright defect area are changed to the values indicating the non-defect area. The values of the pixels in the dark defect area and the bright defect area each having an area not smaller than the area threshold value are not changed. A defect area image representing a defect area after being subjected to the area filtering is thereby acquired for the object area of the target image pickup part 32 (Step S34). In the following processes, it is assumed that the defect area image is dealt as a binary image representing both the bright defect area and the dark defect area as the defect area and defect area information indicating whether each defect area is the bright defect area or the dark defect area is generated separately.

Figure 14:
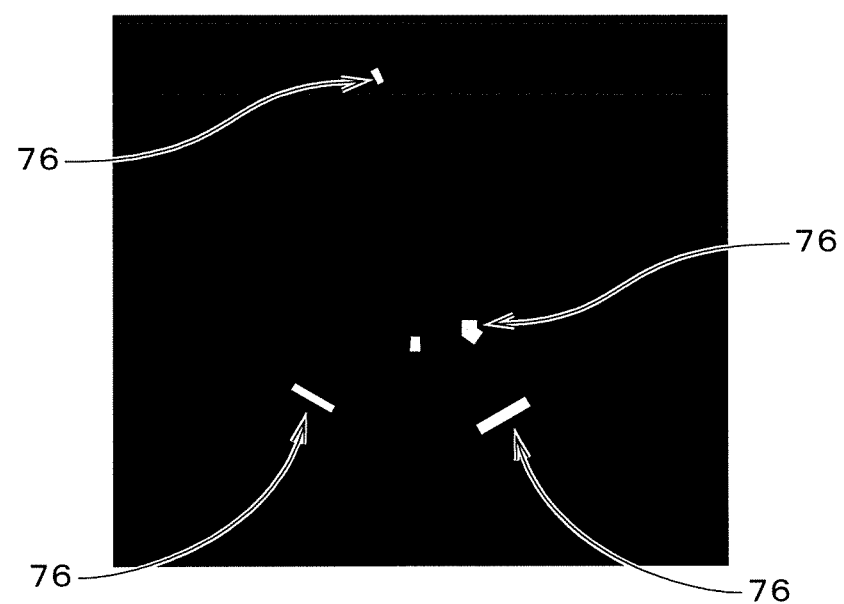
FIG. 14 is a view showing a defect area image.

FIG. 14 is a view showing the defect area image derived from the duplicate candidate area image of FIG. 13. The area of the defect area 76 represented by the defect area image of FIG. 14 is smaller than that of the duplicate candidate area 75 in FIG. 13. Actually, since the area corresponding to the true defect area 71 is maintained as the defect area 76, it can be said that the false defect area (false information) is reduced by performing the process in the false information reducing part 629.

The above-described process by the defect detection part 62 is performed on all the plurality of first picked-up images and the second picked-up image by the control of the detection control part 64. Therefore, in the defect detection part 62, a first defect area image representing a first defect area is generated by using each of the first picked-up images and the first reference image corresponding to the first picked-up image, and the first defect area is detected (FIG. 4: Step S16). Further, a second defect area image representing a second defect area is generated by using the second picked-up image and the second reference image corresponding to the second picked-up image, and the second defect area is detected (Step S17). Assuming that the first defect area image acquired from the first picked-up image by lighting at N degrees is referred to as a "first defect area image by lighting at N degrees", in above-described Step S16, a first defect area image by lighting at −90 degrees, a first defect area image by lighting at −45 degrees, a first defect area image by lighting at 0 degrees, a first defect area image by lighting at +45 degrees, and a first defect area image by lighting at +90 degrees are acquired.

Figure 15:
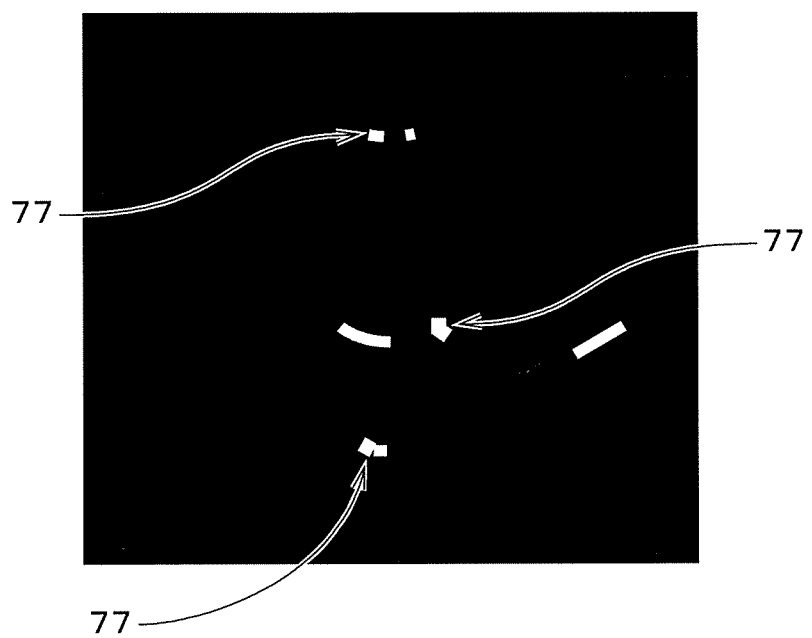
FIG. 15 is a view showing a first defect area image.

FIG. 15 is a view showing a first defect area image by lighting at −45 degrees, which is derived from the first picked-up image of FIG. 6. The first defect area image of FIG. 15 represents first defect areas 77, and the first defect areas 77 include the true defect area 71 of FIG. 6. On the other hand, FIG. 14 described above shows a second defect area image by all lightings at −90 degrees, −45 degrees, 0 degrees, +45 degrees, and +90 degrees, which is derived from the second picked-up image of FIG. 8. The second defect area image of FIG. 14 represents second defect areas 76, and the second defect areas 76 include the true defect area 71 of FIG. 8. The plurality of first defect area images and the second defect area image are outputted to the defect updating part 63.

Figure 16:
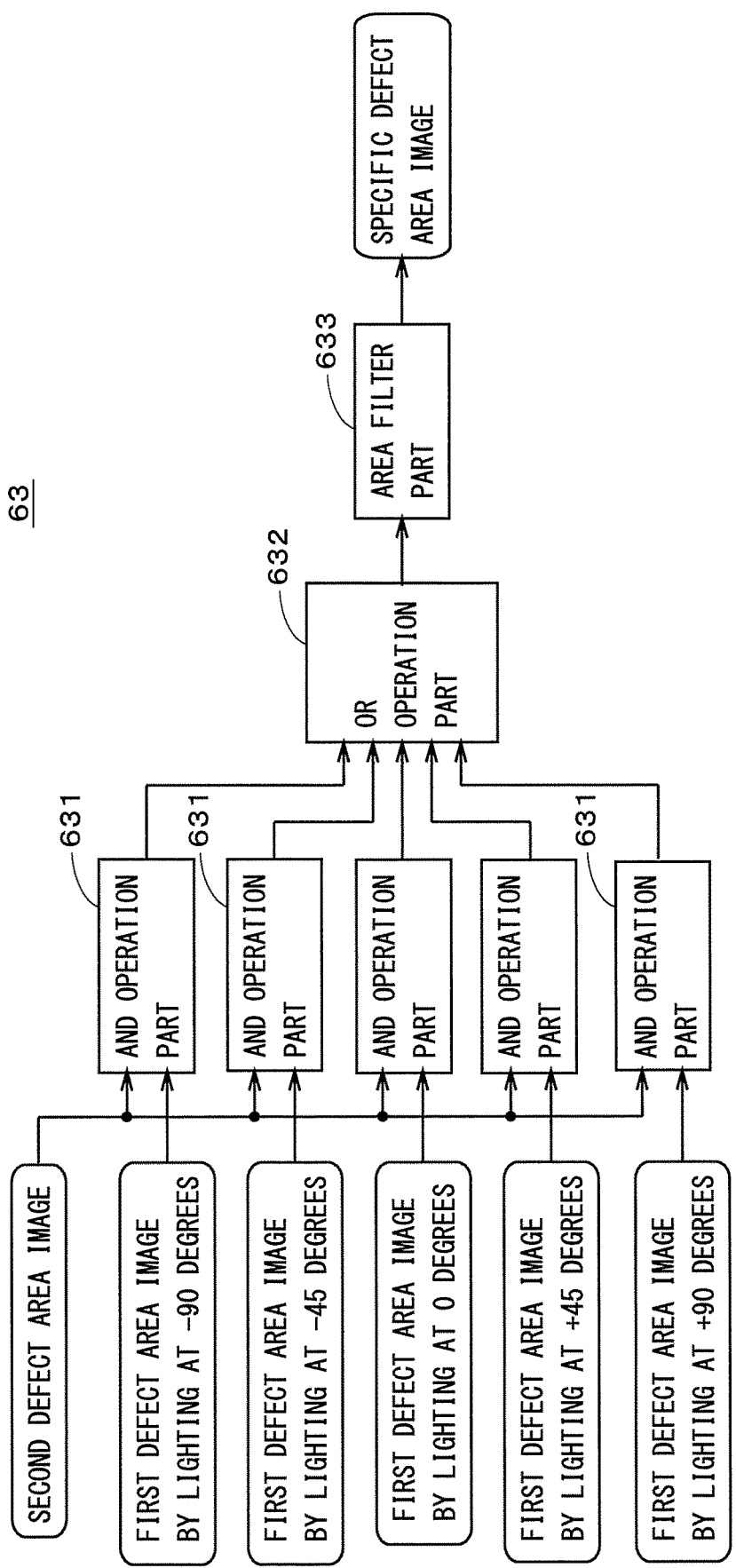
FIG. 16 is a view showing a constitution of a defect updating part.

FIG. 16 is a view showing a constitution of the defect updating part 63. The defect updating part 63 specifies part of the defect area derived from the plurality of picked-up images, as a specific defect area. Specifically, into a plurality of AND operation parts 631, pixel values of the respective first defect area images by lightings at −90 degrees, −45 degrees, 0 degrees, +45 degrees, and +90 degrees are sequentially inputted. Further, into the plurality of AND operation parts 631, pixel values of the second defect area image are also sequentially inputted. Then, in each of the AND operation parts 631, a logical product of a value of each pixel of the second defect area image and a value of the corresponding pixel of the first defect area image is obtained and outputted to an OR operation part 632. Therefore, in each AND operation part 631, when the second defect area image and the first defect area image are accurately overlaid on each other, a value indicating the specific defect area is outputted for the pixel in an area where the second defect area 76 and the first defect area 77 overlap each other. Further, the value indicating the non-defect area is outputted for the pixel in an area where the second defect area 76 and the first defect area 77 do not overlap each other (in other words, outputted for all the remaining pixels). Thus, an overlapping area in the second defect area 76 and the first defect area 77 is substantially specified as the specific defect area in the object area.

Figure 17:
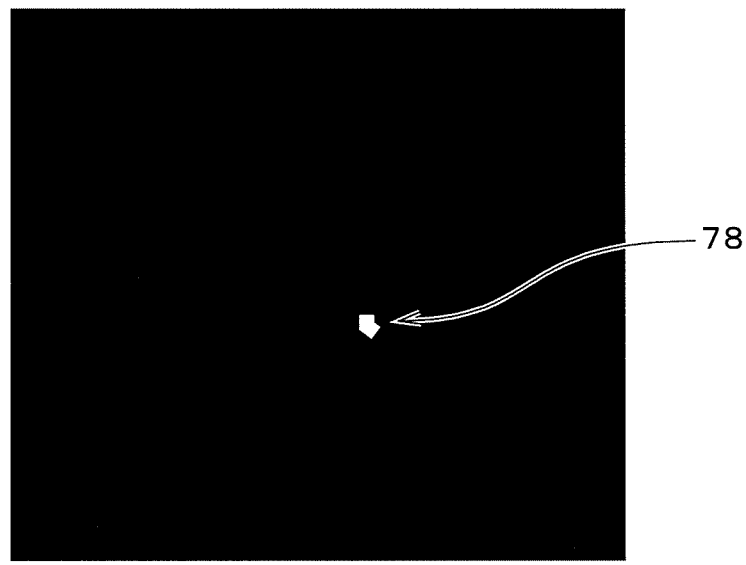
FIG. 17 is a view showing a specific defect area image.

In the OR operation part 632, a logical sum of the values inputted from the plurality of AND operation parts 631 for each pixel of the second defect area image is obtained and outputted to an area filter part 633. Specifically, when the value indicating the specific defect area is inputted for each pixel of the second defect area image from any one of the AND operation parts 631, the value indicating the specific defect area is outputted to the area filter part 633, and when the values indicating the non-defect area are inputted for each pixel of the second defect candidate image from all the AND operation parts 631, the value indicating the non-defect area is outputted to the area filter part 633. In the area filter part 633, generated is an image in which the value inputted from the OR operation part 632 for each pixel of the second defect area image is set as a value of the position of the pixel. Then, in the image, a set of successive pixels each having the value indicating the specific defect area is specified as the specific defect area, and when the area of the specific defect area is smaller than a predetermined area threshold value, the values of the pixels included in the specific defect area are changed to the values indicating the non-defect area. The values of the pixels in the specific defect area having the area not smaller than the area threshold value are not changed. As shown in FIG. 17, a specific defect area image representing the specific defect area 78 is thereby acquired for the object area of the target image pickup part 32 (Step S18). The specific defect area 78 can be regarded as a defect area obtained by updating each of the second defect area 76 of FIG. 14 and the first defect area 77 of FIG. 15. The position of the specific defect area 78 coincides with that of the true defect area 71 shown in FIGS. 6 and 8.

The control part 60 checks if all the selected image pickup parts are specified as the target image pickup part. Herein, since there are some selected image pickup parts which are not specified as the target image pickup part (Step S19), one of the other oblique image pickup parts 32 is specified as the target image pickup part (Step S13). As described earlier, when the main body 11 is viewed from above with a downward line of sight (see FIG. 2), since the four oblique image pickup parts 32 are arranged circumferentially at an angular interval of 90 degrees, an area of the object 9 for which any specific defect area image is not acquired becomes the object area corresponding to a new target image pickup part 32.

After the target image pickup part 32 is specified, like in the above-described case, five first picked-up images are acquired for the object area by lightings at −90 degrees, −45 degrees, 0 degrees, +45 degrees, and +90 degrees (Step S14), and subsequently, the second picked-up image by all lightings at −90 degrees, −45 degrees, 0 degrees, +45 degrees, and +90 degrees is acquired (Step S15). The first defect area image is generated by using each first picked-up image and the first reference image corresponding to the first picked-up image (Step S16), and the second defect area image is generated by using the second picked-up image and the second reference image corresponding to the second picked-up image (Step S17). Then, from the plurality of first defect area images and the second defect area image, the specific defect area image for the object area is acquired (Step S18).

In the inspection apparatus 1, while using all the selected image pickup parts as the target image pickup part, the above process for acquiring the specific defect area image is performed (Step S19). The specific defect area image is thereby acquired for each of the four object areas arranged on the object 9 circumferentially at an angular interval of 90 degrees.

Subsequently, the control part 60 checks if the stage 2 has been rotated at predetermined times. Herein, since the stage 2 has not been rotated (Step S20), the stage rotation part 21 rotates the stage 2 about the central axis J1 by 45 degrees (Step S21). In each combination of circumferentially adjacent two object areas among the above-described four object areas, an area between the two object areas is thereby caused to face one of the oblique image pickup parts 32. Then, like in the above-described case, Steps S13 to S18 are repeated (Step S19). As a result, the specific defect area image is acquired for each of eight object areas arranged on the object 9 circumferentially at an angular interval of 45 degrees. Since the eight object areas are successively arranged circumferentially along the entire circumference, the defects of the object 9 are detected circumferentially along the entire circumference. The eight object areas may partially overlap one another. The control part 60 confirms that the stage 2 has been rotated at the predetermined times, and the inspection of the object 9 is completed (Step S20).

Though the case has been described where the four oblique image pickup parts 32 are specified as the selected image pickup parts and the oblique light source parts 42 placed at the angular positions of −90 degrees, −45 degrees, 0 degrees, +45 degrees, and +90 degrees with respect to each of the oblique image pickup parts 32 which are the selected image pickup parts are used as the specific light source part group in the above-described exemplary process, other combinations of the selected image pickup parts and the specific light source part group may be used. For example, there may be another case where the four side image pickup parts 33 are specified as the selected image pickup parts and the side light source parts 43 placed at the angular positions of −90 degrees, −45 degrees, 0 degrees, +45 degrees, and +90 degrees with respect to each of the side image pickup parts 33 which are the selected image pickup parts are used as the specific light source part group. Further, a plurality of side light source parts 43 may be used as the specific light source part group with respect to the oblique image pickup part 32 which is the selected image pickup part, and a plurality of oblique light source parts 42 may be used as the specific light source part group with respect to the side image pickup part 33 which is the selected image pickup part.

Furthermore, the upper image pickup part 31 may be specified as the selected image pickup part, and the upper light source part 41 may be used as one included in the specific light source part group. Depending on the type of the object 9, only the light source parts placed at the angular positions of −45 degrees, 0 degrees, and +45 degrees with respect to the selected image pickup part may be used as the specific light source part group. The specific light source part group may include the upper light source part 41, the oblique light source parts 42, and the side light source parts 43. It is preferable that the number of light source parts used as the specific light source part group with respect to each selected image pickup part should be not less than 3 (e.g., not more than 5). In the inspection apparatus 1, by specifying various image pickup parts as the selected image pickup parts and using a plurality of various light source parts as the specific light source part group with respect to each selected image pickup part, a defect detection can be performed with high accuracy.

In the picked-up image acquired by the image pickup part, since a bright area having a high pixel value is formed mainly of a regular reflection component of the light from the light source part on the surface of the object 9, the pixel value is apt to be largely changed due to the effect of the microscopic projections and depressions on the surface of the object 9. In other words, the bright area is apt to suffer the effect of the satin-finished surface and easily causes a false defect. On the other hand, since a dark area having a low pixel value is formed mainly of a diffuse reflection component of the light from the light source part on the surface of the object 9, the pixel value is not apt to be changed due to the effect of the microscopic projections and depressions on the surface of the object 9. In other words, the dark area is not apt to suffer the effect of the satin-finished surface and does not easily cause a false defect.

In the defect detection part 62 of the inspection apparatus 1, the defect candidate area is detected on the basis of the difference between the value of each pixel in the picked-up image and the value of the corresponding pixel in the reference image, and the defect area is detected on the basis of the ratio between the value of each pixel in the picked-up image included in the defect candidate area and the value of the corresponding pixel in the reference image. Therefore, for example, even if there are defect candidate areas having the same difference in the pixel value between the picked-up image and the reference image, in the defect candidate area having a high pixel value in the reference image used as a reference, the ratio of the pixel values is closer to 1 (it can be regarded that the degree of effect of the difference in the pixel value is smaller) than that in the defect candidate area having a low pixel value in the reference image, and such a defect candidate area can be removed, or the like, as the area which indicates a false defect with high probability. As a result, in the defect detection part 62, it is possible to appropriately remove the false defect area due to the microscopic projections and depressions on the satin-finished surface of the object 9, in other words, suppress detection of a false defect, and detect a defect (true defect) with high accuracy.

In the defect detection part 62, the defect candidate area based on the self-comparison is further detected, and an overlapping area in the defect candidate area based on the difference and the defect candidate area based on the self-comparison is detected as the duplicate candidate area. Then, the defect area is detected on the basis of the ratio between the value of each pixel in the picked-up image included in the duplicate candidate area and the value of the corresponding pixel in the reference image. It is thereby possible to further suppress detection of a false defect and detect a defect with higher accuracy. Further, since the defect area detected on the basis of the above ratio includes a defect candidate area in which the value of a pixel in the picked-up image is lower than the value of the corresponding pixel in the reference image and a defect candidate area in which the value of a pixel in the picked-up image is higher than the value of the corresponding pixel in the reference image, being distinguished from each other, it is possible to deal a bright defect and a dark defect, being distinguished from each other.

In the inspection apparatus 1, a plurality of light source parts for irradiating an object area facing an image pickup part with light from a plurality of directions, respectively, are provided, the first picked-up image is acquired in the image pickup part by light irradiation from one of the plurality of light source parts, and the second picked-up image is acquired in the image pickup part by light irradiation from the plurality of light source parts. Further, the first defect area is detected by using the first picked-up image and the first reference image corresponding to the first picked-up image, and the second defect area is detected by using the second picked-up image and the second reference image corresponding to the second picked-up image. Then, an overlapping area in the first defect area and the second defect area is specified as an updated defect area (specific defect area) in the object area. It is thereby possible to further suppress detection of a false defect and detect a defect with higher accuracy.

Further, in the inspection of the object 9, by sequentially using the plurality of light source parts, a plurality of first picked-up images are acquired in the image pickup part. By comparing the plurality of first picked-up images with the plurality of first reference images corresponding to the plurality of first picked-up images, respectively, a plurality of first defect area images each representing a first defect area are generated. Then, an overlapping area in the first defect area represented by each first defect area image and the second defect area is specified as the updated defect area in the object area. Thus, since the plurality of first picked-up images are acquired by using the plurality of light source parts with respect to one object area (an image pickup position of one image pickup part) and the defect area in the object area is detected on the basis of the plurality of first picked-up images, it is possible to detect a defect on the surface of the object 9 more stably (more reliably).

In the inspection apparatus 1, since the upper image pickup part 31, the plurality of oblique image pickup parts 32, and the plurality of side image pickup parts 33 are provided, it is possible to reduce blind spots of the object 9 and to increase the reliability of the inspection on the object 9.

Though the ratio of the pixel values between the picked-up image and the reference image is obtained only for the overlapping area (duplicate candidate area) of the defect candidate area based on the difference and the defect candidate area based on the self-comparison in the present exemplary process, the ratio of the pixel values may be obtained for the entire image. In this case, an image representing the ratio of the pixel values between the picked-up image and the reference image is generated and an area of the image, which is included in the first determination range and the second determination range, is detected as the defect candidate area (hereinafter, referred to as a "defect candidate area based on a ratio"). Then, an overlapping area in the defect candidate area based on the difference, the defect candidate area based on the self-comparison, and the defect candidate area based on the ratio is detected as the defect area. Further, depending on the type of the object 9, the image pickup condition of the image, and the like, the detection of the defect candidate area based on the self-comparison may be omitted.

As described above, in the inspection apparatus 1, it is important that the overlapping area in the first defect candidate area detected on the basis of the difference between the value of each pixel of the picked-up image and the value of the corresponding pixel of the reference image and the second defect candidate area detected on the basis of the ratio between the value of each pixel of the picked-up image and the value of the corresponding pixel of the reference image is detected as the defect area. It is thereby possible to suppress detection of a false defect and detect a defect with high accuracy.

Preferably, the first defect candidate area is obtained on the basis of an image representing the difference between the picked-up image and the reference image, and subsequently the defect area is detected on the basis of the ratio between the value of each pixel of the picked-up image included in the first defect candidate area and the value of the corresponding pixel of the reference image. Thus, by limiting the pixels to be used for obtaining the above ratio between the picked-up image and the reference image to the pixels included in the first defect candidate area, without obtaining the above ratio on unnecessary pixels, it is possible to detect a defect with high efficiency. Similarly, there may be a case where the second defect candidate area is obtained on the basis of an image representing the ratio between the picked-up image and the reference image and subsequently the defect area is detected on the basis of the difference between the value of each pixel of the picked-up image included in the second defect candidate area and the value of the corresponding pixel of the reference image. In other words, also when the pixels to be used for obtaining the above difference between the picked-up image and the reference image are limited to the pixels included in the second defect candidate area, without obtaining the above difference on unnecessary pixels, it is possible to detect a defect with high efficiency.

From the viewpoint of further suppressing detection of a false defect, it is preferable that the detection of the defect candidate area based on the self-comparison should be performed. In this case, depending on the type of the defect to be detected, the defect candidate area based on the self-comparison may be one of an area (i.e., an area represented by the first intermediate image) obtained by binarizing an image representing the difference between the picked-up image and the picked-up image after being subjected to the expansion process and an area (i.e., an area represented by the second intermediate image) obtained by binarizing an image representing the difference between the picked-up image and the picked-up image after being subjected to the contraction process. Thus, by detecting a third defect candidate area on the basis of the difference between the value of each pixel in the picked-up image and the value of the corresponding pixel in the image obtained by performing the expansion process or the contraction process on the picked-up image and detecting an overlapping area in the first defect candidate area, the second defect candidate area, and the third defect candidate area as the defect area, it becomes possible to further suppress detection of a false defect. Further, in the defect detection part 62 of FIG. 9, by limiting the pixels to be used to obtain the ratio between the picked-up image and the reference image to the pixels included in both the first defect candidate area and the third defect candidate area, achieved is detection of a defect with high efficiency.

In the inspection apparatus 1, various modifications can be made.

Though the process in which the difference in the pixel value between the picked-up image and the reference image is obtained and the defect candidate area is thereby detected and the process in which the ratio of the pixel values is obtained and the defect candidate area is thereby detected (or limited) are performed separately in the above-described preferred embodiment, depending on the type of the object 9, the image pickup condition of the image, and the like, these processes may be performed at the same time. In this case, a differential image representing (absolute values of) differences in the pixel values between the picked-up image and the reference image is acquired, and by dividing a value of each pixel in the differential image by a value of the corresponding pixel in the reference image, a ratio therebetween is obtained. Then, when the ratio in each pixel is included in, for example, a determination range having an upper limit value and a lower limit value, a value indicating the defect area is given to the position of the pixel. When the ratio in the pixel is not included in the determination range, a value indicating the non-defect area is given to the position of the pixel. Also in this case, for example, when there are a plurality of areas having the same difference in the pixel value between the picked-up image and the reference image, in accordance with the value of the pixel in the reference image (in consideration of the degree of effect of the difference on the value of the pixel in the reference image), it becomes possible to divide the plurality of areas into the false defect area(s) and the true defect area(s). Thus, in the defect detection part 62, by detecting the defect area on the basis of the ratio between the value of each pixel in the differential image of the picked-up image and the reference image and the value of the corresponding pixel in the reference image, it is possible to suppress detection of a false defect and detect a true defect with high accuracy.

Depending on the type of the object 9, only one of the first defect area image and the second defect area image may be generated with respect to a selected image pickup part, and a defect area represented by the defect area image may be dealt as the final defect area.

Figure 18:
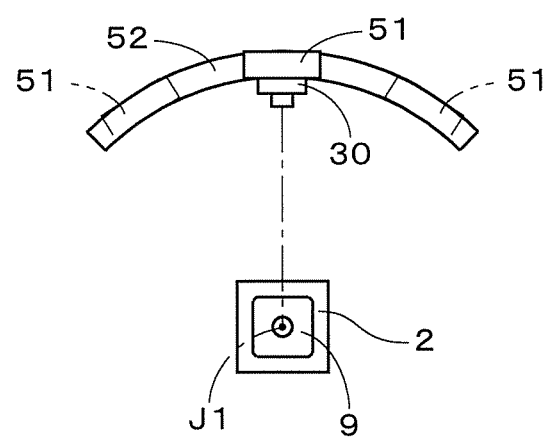
FIG. 18 is a view showing another example of the inspection apparatus.

Though the plurality of light source parts for irradiating the object area with light from a plurality of directions are provided as the second lighting part and one of the plurality of light source parts is dealt as the first lighting part in the above-described inspection apparatus 1, the first lighting part 51 and the second lighting part 52 may be separately provided, as shown in FIG. 18. The first lighting part 51 can irradiate the object area on the surface of the object 9 with light from only one direction and the second lighting part 52 can irradiate the object area with light from a plurality of directions. In the exemplary configuration of FIG. 18, the first lighting part 51 is fixed onto an upper surface of the image pickup part 30 and the second lighting part 52 is fixed onto a lower surface of the image pickup part 30. In the second lighting part 52, a plurality of LEDs are arranged like an arc along the circumferential direction. In order to detect a defect more stably, it is preferable that a plurality of first lighting parts 51 for irradiating the object area with light from a plurality of different directions should be provided as indicated by a two-dot chain line of FIG. 18 and a plurality of first picked-up images representing the object area should be acquired by using the plurality of first lighting parts 51. Further, by omitting the first lighting part 51 and lighting only several LEDs successively provided in the second lighting part 52 as the first lighting part, it is also possible to irradiate the object area with light from only one direction. In this case, it can be regarded that a plurality of light source parts each of which consists of several LEDs successively provided are arranged circumferentially in the second lighting part 52.

The first lighting part may be, for example, a part which irradiates the object area with light from a plurality of light sources which are slightly away (separated) from one another, only if the part irradiates the object area with light from substantially only one direction. From the viewpoint that an image pickup condition (a position where the false defect area occurs) is changed between the second picked-up image acquired by using the second lighting part and the first picked-up image acquired by using the first lighting part, it is preferable that lighting directions in which each position of the object area is irradiated with light by the second lighting part should include two directions away from each other by 45 degrees or more, and more preferably, the lighting directions should include two directions away from each other by 60 degrees or more.

Though the operation flow of FIG. 4 has been described, for easy understanding, assuming that the acquisition of the first picked-up image by one target image pickup part, the acquisition of the second picked-up image by the target image pickup part, the generation of the first defect area image from the first picked-up image, and the generation of the second defect area image from the second picked-up image are sequentially performed, for example, after the acquisition of the first picked-up image, the acquisition of the second picked-up image and the generation of the first defect area image may be performed concurrently. Further, there may be a case where the first picked-up images of a plurality of object areas are sequentially acquired by a plurality of selected image pickup parts and subsequently the second picked-up images of the plurality of object areas are sequentially acquired. Thus, the operation flow of FIG. 4 can be changed as appropriate.

The inspection apparatus 1 may be used for detection of a defect on surfaces of other objects such as various substrates, films, or the like on which patterns are formed. It can be said, however, that the inspection apparatus 1 capable of suppressing detection of a false defect is particularly suitable for the inspection of an object having a satin-finished area (not limited on a metal surface) on its surface, which easily causes a false defect.

The configurations in the above-discussed preferred embodiment and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention.

REFERENCE SIGNS LIST

1 Inspection apparatus
9 Object
30 to 33 Image pickup part
41 to 43 Light source part
51 First lighting part
52 Second lighting part
62 Defect detection part
63 Defect updating part
64 Detection control part
69 Storage part
73, 74 Defect candidate area
75 Duplicate candidate area
76 Second defect area
77 First defect area
78 Specific defect area
691 First reference image data
692 Second reference image data
S11 to S21, S31 to S34 Step

The invention claimed is:

1. An inspection apparatus for detecting a defect on a surface of an object, the inspection apparatus comprising:
an image pickup part for picking up an image of an object to thereby acquire a picked-up image;
a storage part for storing therein a reference image corresponding to said picked-up image; and
a defect detection part for detecting, as a defect area, an overlapping area in a first defect candidate area detected on the basis of a difference between a tone value of each pixel in said picked-up image and a tone value of a corresponding pixel in said reference image and a second defect candidate area detected on the basis of a ratio between a tone value of each pixel in said picked-up image and a tone value of a corresponding pixel in said reference image,
wherein said defect detection part detects a third defect candidate area on the basis of a difference between a tone value of each pixel in said picked-up image and a tone value of a corresponding pixel in an image obtained by performing an expansion process or a contraction process on said picked-up image, and detects an overlapping area in said first defect candidate area, said second defect candidate area, and said third defect candidate area, as said defect area.

2. The inspection apparatus according to claim 1, wherein said defect detection part limits pixels to be used for obtaining said ratio between said picked-up image and said reference image to pixels included in said first defect candidate area, or limits pixels to be used for obtaining said difference between said picked-up image and said reference image to pixels included in said second defect candidate area.

3. The inspection apparatus according to claim 1, wherein said second defect candidate area includes a defect candidate area in which a tone value of a pixel in said picked-up image is lower than a tone value of a corresponding pixel in said reference image and a defect candidate area in which a tone value of a pixel in said picked-up image is higher than a tone value of a corresponding pixel in said reference image, being distinguished from each other.

4. An inspection apparatus for detecting a defect on a surface of an object, the inspection apparatus comprising:
an image pickup part for picking up an image of an object to thereby acquire a picked-up image;
a storage part for storing therein a reference image corresponding to said picked-up image;
a defect detection part
for detecting, as a defect area, an overlapping area in a first defect candidate area detected on the basis of a difference between a tone value of each pixel in said picked-up image and a tone value of a corresponding pixel in said reference image and a second defect candidate area detected on the basis of a ratio between a tone value of each pixel in said picked-up image and a tone value of a corresponding pixel in said reference image, or
for detecting a defect area on the basis of a ratio between a tone value of each pixel in a differential image of said picked-up image and said reference image and a tone value of a corresponding pixel in said reference image;
a first lighting part for irradiating a predetermined object area on a surface of said object with light from only one direction;
a second lighting part for irradiating said object area with light from a plurality of directions;
a detection control part for causing said defect detection part to detect a first defect area by using a first picked-up image acquired in said image pickup part by light irradiation from said first lighting part and a first reference image corresponding to said first picked-up image and causing said defect detection part to detect a second defect area by using a second picked-up image acquired in said image pickup part by light irradiation from said second lighting part and a second reference image corresponding to said second picked-up image; and
a defect updating part for specifying an overlapping area in said first defect area and said second defect area, as an updated defect area.

5. An inspection method of detecting a defect on a surface of an object, the inspection method comprising:
a) picking up an image of an object in an image pickup part to thereby acquire a picked-up image; and
b) detecting an overlapping area in a first defect candidate area detected on the basis of a difference between a tone value of each pixel in said picked-up image and a tone value of a corresponding pixel in a reference image and a second defect candidate area detected on the basis of a ratio between a tone value of each pixel in said picked-up image and a tone value of a corresponding pixel in said reference image, as a defect area,
wherein a third defect candidate area is detected on the basis of a difference between a tone value of each pixel in said picked-up image and a tone value of a corresponding pixel in an image obtained by performing an expansion process or a contraction process on said picked-up image, and an overlapping area in said first defect candidate area, said second defect candidate area, and said third defect candidate area is detected as said defect area in said operation b).

6. The inspection method according to claim 5, wherein pixels to be used for obtaining said ratio between said picked-up image and said reference image are limited to pixels included in said first defect candidate area, or pixels to be used for obtaining said difference between said picked-up image and said reference image are limited to pixels included in said second defect candidate area in said operation b).

7. The inspection method according to claim 5, wherein said second defect candidate area includes a defect candidate area in which a tone value of a pixel in said picked-up image is lower than a tone value of a corresponding pixel in said reference image and a defect candidate area in which a tone value of a pixel in said picked-up image is higher than a tone value of a corresponding pixel in said reference image, being distinguished from each other.

8. An inspection method of detecting a defect on a surface of an object, the inspection method comprising:
a) picking up an image of an object in an image pickup part to thereby acquire a picked-up image; and
b) detecting an overlapping area in a first defect candidate area detected on the basis of a difference between a tone value of each pixel in said picked-up image and a tone value of a corresponding pixel in a reference image and a second defect candidate area detected on the basis of a ratio between a tone value of each pixel in said picked-up image and a tone value of a corresponding pixel in said reference image, as a defect area, or detecting a defect area on the basis of a ratio between a tone value of each pixel in a differential image of said picked-up image and said reference image, and a tone value of a corresponding pixel in said reference image, said reference image corresponding to said picked-up image and being prepared in advance, wherein
a first picked-up image is acquired in said image pickup part while a predetermined object area on a surface of said object is irradiated with light from only one direction in said operation a); and
a first defect area is detected by using said first picked-up image and a first reference image corresponding to said first picked-up image in said operation b),
said inspection method further comprising:
acquiring a second picked-up image in said image pickup part while irradiating said object area with light from a plurality of directions;
detecting a second defect area by performing the same operation as said operation b), said same operation using said second picked-up image and a second reference image corresponding to said second picked-up image; and
specifying an overlapping area in said first defect area and said second defect area, as an updated defect area.

9. An inspection apparatus for detecting a defect on a surface of an object, comprising:
- an image pickup part for picking up an image of an object to thereby acquire a picked-up image;
- a storage part for storing therein a reference image corresponding to said picked-up image;
- a defect detection part for detecting, as a defect area, an overlapping area in a first defect candidate area detected on the basis of a difference between a tone value of each pixel in said picked-up image and a tone value of a corresponding pixel in said reference image and a second defect candidate area detected on the basis of a ratio between a tone value of each pixel in said picked-up image and a tone value of a corresponding pixel in said reference image;
- a first lighting part for irradiating a predetermined object area on a surface of said object with light from only one direction;
- a second lighting part for irradiating said object area with light from a plurality of directions;
- a detection control part for causing said defect detection part to detect a first defect area by using a first picked-up image acquired in said image pickup part by light irradiation from said first lighting part and a first reference image corresponding to said first picked-up image and causing said defect detection part to detect a second defect area by using a second picked-up image acquired in said image pickup part by light irradiation from said second lighting part and a second reference image corresponding to said second picked-up image; and
- a defect updating part for specifying an overlapping area in said first defect area and said second defect area, as an updated defect area,
- wherein said defect detection part limits pixels to be used for obtaining said ratio between said picked-up image and said reference image to pixels included in said first defect candidate area, or limits pixels to be used for obtaining said difference between said picked-up image and said reference image to pixels included in said second defect candidate area.

10. An inspection apparatus for detecting a defect on a surface of an object, the inspection apparatus comprising:
- an image pickup part for picking up an image of an object to thereby acquire a picked-up image;
- a storage part for storing therein a reference image corresponding to said picked-up image;
- a defect detection part for detecting, as a defect area, an overlapping area in a first defect candidate area detected on the basis of a difference between a tone value of each pixel in said picked-up image and a tone value of a corresponding pixel in said reference image and a second defect candidate area detected on the basis of a ratio between a tone value of each pixel in said picked-up image and a tone value of a corresponding pixel in said reference image;
- a first lighting part for irradiating a predetermined object area on a surface of said object with light from only one direction;
- a second lighting part for irradiating said object area with light from a plurality of directions;
- a detection control part for causing said defect detection part to detect a first defect area by using a first picked-up image acquired in said image pickup part by light irradiation from said first lighting part and a first reference image corresponding to said first picked-up image and causing said defect detection part to detect a second defect area by using a second picked-up image acquired in said image pickup part by light irradiation from said second lighting part and a second reference image corresponding to said second picked-up image; and
- a defect updating part for specifying an overlapping area in said first defect area and said second defect area, as an updated defect area,
- wherein said second defect candidate area includes a defect candidate area in which a tone value of a pixel in said picked-up image is lower than a tone value of a corresponding pixel in said reference image and a defect candidate area in which a tone value of a pixel in said picked-up image is higher than a tone value of a corresponding pixel in said reference image, being distinguished from each other.

11. An inspection apparatus for detecting a defect on a surface of an object, the inspection apparatus comprising:
- an image pickup part for picking up an image of an object to thereby acquire a picked-up image;
- a storage part for storing therein a reference image corresponding to said picked-up image;
- a defect detection part for detecting, as a defect area, an overlapping area in a first defect candidate area detected on the basis of a difference between a tone value of each pixel in said picked-up image and a tone value of a corresponding pixel in said reference image and a second defect candidate area detected on the basis of a ratio between a tone value of each pixel in said picked-up image and a tone value of a corresponding pixel in said reference image;
- a first lighting part for irradiating a predetermined object area on a surface of said object with light from only one direction;
- a second lighting part for irradiating said object area with light from a plurality of directions;
- a detection control part for causing said defect detection part to detect a first defect area by using a first picked-up image acquired in said image pickup part by light irradiation from said first lighting part and a first reference image corresponding to said first picked-up image and causing said defect detection part to detect a second defect area by using a second picked-up image acquired in said image pickup part by light irradiation from said second lighting part and a second reference image corresponding to said second picked-up image; and
- a defect updating part for specifying an overlapping area in said first defect area and said second defect area, as an updated defect area,
- wherein said defect detection part detects a third defect candidate area on the basis of a difference between a tone value of each pixel in said picked-up image and a tone value of a corresponding pixel in an image obtained by performing an expansion process or a contraction process on said picked-up image, and detects an overlapping area in said first defect candidate area, said second defect candidate area, and said third defect candidate area, as said defect area.

* * * * *